(12) United States Patent
Choi et al.

(10) Patent No.: US 10,554,952 B2
(45) Date of Patent: Feb. 4, 2020

(54) STEREO TYPE DISTANCE RECOGNITION APPARATUS AND METHOD

(71) Applicant: Daegu Gyeongbuk Institute of Science and Technology, Daegu (KR)

(72) Inventors: Moon Jong Choi, Daegu (KR); Rock Hyun Choi, Daegu (KR); Jae Sung Choi, Daegu (KR); Won Seok Kang, Daegu (KR); Dong Ha Lee, Daegu (KR)

(73) Assignee: Daegu Gyeongbuk Institute of Science and Technology, Daegu (KR)

( * ) Notice: Subject to any disclaimer, the term of this patent is extended or adjusted under 35 U.S.C. 154(b) by 443 days.

(21) Appl. No.: 15/644,974

(22) Filed: Jul. 10, 2017

(65) Prior Publication Data

US 2017/0310949 A1 Oct. 26, 2017

Related U.S. Application Data

(63) Continuation of application No. 14/496,065, filed on Sep. 25, 2014, now Pat. No. 9,729,859.

(30) Foreign Application Priority Data

Dec. 27, 2013 (KR) .................. 10-2013-0164708

(51) Int. Cl.
*H04N 13/00* (2018.01)
*H04N 13/254* (2018.01)
(Continued)

(52) U.S. Cl.
CPC ......... *H04N 13/254* (2018.05); *G01B 11/026* (2013.01); *H04N 13/239* (2018.05); *H04N 2013/0081* (2013.01)

(58) Field of Classification Search
USPC ...................................... 356/4.01
See application file for complete search history.

(56) References Cited

U.S. PATENT DOCUMENTS 8,976,249 B2    3/2015  Kim
9,729,859 B2 *  8/2017  Choi .................. G01B 11/026
(Continued)

FOREIGN PATENT DOCUMENTS

JP  08-304068 A     11/1996
KR  20120053276 A    5/2012
KR  20130104170 A    9/2013

OTHER PUBLICATIONS

Korean Office Action dated Dec. 1, 2014 for corresponding Korean Patent Application No. 10-2013-0164708.
(Continued)

*Primary Examiner* — James R Hulka
(74) *Attorney, Agent, or Firm* — Eversheds Sutherland (US) LLP

(57) ABSTRACT

A stereo type distance recognition apparatus and method are provided. The stereo type distance recognition apparatus may include a plurality of sensors to generate a plurality of infrared (IR) signals, a communication unit to insert a set first pattern into each of the plurality of generated IR signals and to transmit the IR signals to an object, and a processor to extract a second pattern from each of signals reflected from the object by the plurality of IR signals, to cancel an interference signal from each of the reflected signals based on a result of a comparison between the first pattern and the second pattern, and to compute a distance from the object based on signals from which the interference signal is cancelled.

9 Claims, 3 Drawing Sheets

(51) Int. Cl.
*G01B 11/02* (2006.01)
*H04N 13/239* (2018.01)

(56) References Cited

U.S. PATENT DOCUMENTS

| | | | |
|---|---|---|---|
| 10,397,552 B2* | 8/2019 | Van Nieuwenhove | ...................... H04N 13/246 |
| 2004/0184677 A1* | 9/2004 | Raskar | ...................... G06T 5/50 382/284 |
| 2009/0225329 A1* | 9/2009 | Bendall | .................. G01B 11/25 356/610 |
| 2010/0214411 A1* | 8/2010 | Weinmann | ............. B64D 45/00 348/148 |
| 2011/0080490 A1* | 4/2011 | Clarkson | ................. G06F 3/017 348/222.1 |
| 2012/0182410 A1* | 7/2012 | Wang | ................. H04N 5/23229 348/77 |
| 2013/0194390 A1 | 8/2013 | Hirooka | |
| 2013/0295990 A1* | 11/2013 | Jechoux | ................ H04W 88/06 455/553.1 |
| 2014/0028804 A1 | 1/2014 | Usuda et al. | |
| 2015/0145960 A1 | 5/2015 | Kim | |
| 2015/0185326 A1* | 7/2015 | Choi | .................... G01B 11/026 356/4.01 |

OTHER PUBLICATIONS

Korean Office Action dated Jun. 19, 2015 for corresponding Korean Patent Application No. 10-2013-0164708.

\* cited by examiner

STEREO TYPE DISTANCE RECOGNITION APPARATUS AND METHOD

CROSS-REFERENCE TO RELATED APPLICATIONS

This application is a continuation of U.S. patent application Ser. No. 14/496,065, filed on Sep. 25, 2014, which claims priority to Korean Patent Application No. 10-2013-0164708, filed on Dec. 27, 2013, the disclosures of which are incorporated herein by reference.

BACKGROUND

1. Field of the Invention

The present invention relates to a stereo type distance recognition apparatus and method that may compute a distance from an object based on signals reflected from the object by a plurality of infrared (IR) signals.

2. Description of the Related Art

In a distance recognition scheme using infrared (IR) rays, a distance may be accurately measured, compared to a distance recognition scheme using ultrasonic waves.

However, since IR rays are included in visible rays under the sun or lightings, an existing IR sensor may receive a signal with interference caused by IR rays in visible rays from an object, which may cause an error in computation of a distance from the object based on the signal.

Accordingly, there is a desire for a technology for more accurately measuring a distance from an object.

SUMMARY

An aspect of the present invention is to accurately measure a distance from an object, by transmitting a plurality of infrared (IR) signals to the object, and by computing the distance based on a first signal and a second signal reflected from the object by the IR signals.

Another aspect of the present invention is to more accurately measure a distance from an object, by inserting a first pattern into each of a plurality of IR signals, by transmitting the IR signals to the object, by extracting a second pattern from each of a first signal and a second signal reflected from the object by the IR signals, and by cancelling an interference signal (for example, IR rays in visible rays) from the first signal and the second signal based on a result of comparing the extracted second pattern to the first pattern.

According to an aspect of the present invention, there is provided a stereo type distance recognition apparatus including: a plurality of sensors to generate a plurality of IR signals; a communication unit to insert a set first pattern into each of the plurality of generated IR signals and to transmit the IR signals to an object; and a processor to extract a second pattern from each of signals reflected from the object by the plurality of IR signals, to cancel an interference signal from each of the reflected signals based on a result of a comparison between the first pattern and the second pattern, and to compute a distance from the object based on signals from which the interference signal is cancelled.

The processor may compare magnitudes of the reflected signals, and may compute the distance based on a signal having a relatively high magnitude.

The processor may compare loss rates of the reflected signals, and may compute the distance, using a signal having a relatively low loss rate, based on a result of the comparing.

The processor may extract a same area from the reflected signals by comparing the reflected signals, and may compute the distance based on the extracted area.

The communication unit may insert different first patterns into the plurality of IR signals, respectively.

The processor may eliminate IR rays as the interference signal during transmission of the IR signals to the object and reflection of the signals from the object. The IR rays may be emitted from the sun or a lighting, and may be included in the reflected signals.

The communication unit may simultaneously transmit the IR signals to the object.

The sensors may include a stereo type IR sensor to generate the IR signals.

According to another aspect of the present invention, there is provided a stereo type distance recognition method, including: generating a plurality of IR signals; inserting a set first pattern into each of the plurality of generated IR signals and transmitting the IR signals to an object; extracting a second pattern from each of signals reflected from the object by the plurality of IR signals; cancelling an interference signal from each of the reflected signals based on a result of a comparison between the first pattern and the second pattern; and computing a distance from the object, based on signals from which the interference signal is cancelled.

Effect

According to embodiments of the present invention, it is possible to accurately measure by transmitting a plurality of infrared (IR) signals to the object, and by computing the distance based on a first signal and a second signal reflected from the object by the IR signals.

Additionally, according to embodiments of the present invention, it is possible to more accurately measure a distance from an object, by inserting a first pattern into each of a plurality of IR signals, by transmitting the IR signals to the object, by extracting a second pattern from each of a first signal and a second signal reflected from the object by the IR signals, and by cancelling an interference signal (for example, IR rays in visible rays) from the first signal and the second signal based on a result of comparing the extracted second pattern to the first pattern.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
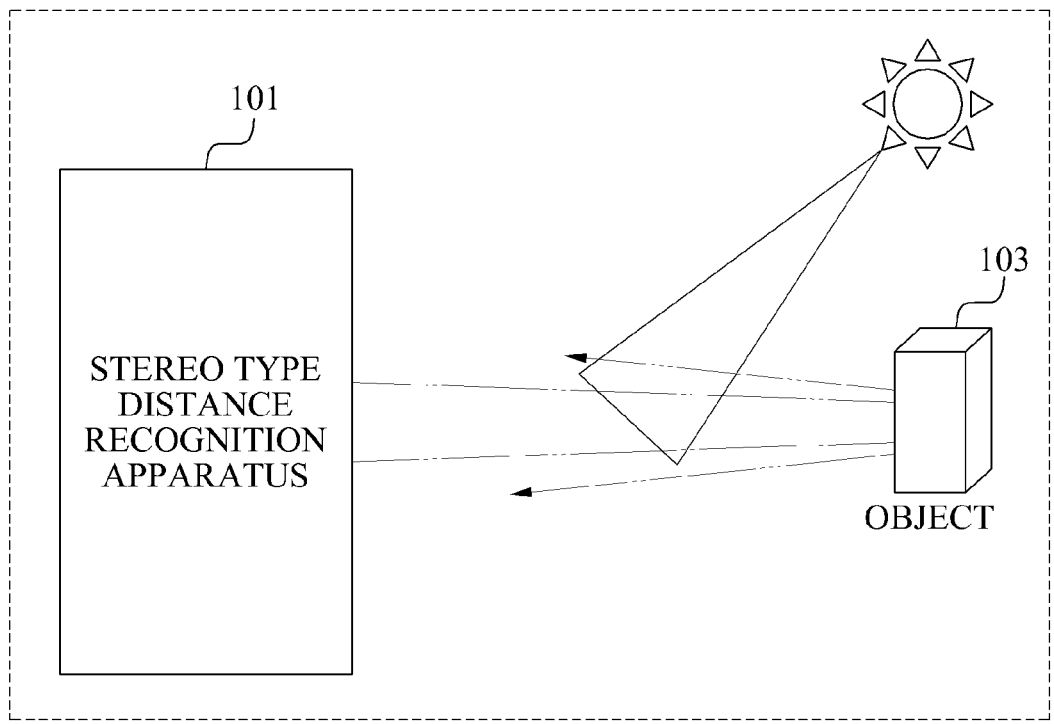
FIG. 1 is a diagram illustrating a concept of distance recognition in a stereo type distance recognition apparatus according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a concept of distance recognition in a stereo type distance recognition apparatus 101 according to an embodiment of the present invention.

Referring to FIG. 1, the stereo type distance recognition apparatus 101 may transmit a plurality of infrared (IR) signals to an object 103, and may receive signals reflected from the object 103 by the IR signals. The stereo type distance recognition apparatus 101 may compute a distance from the object 103, based on the received signals.

The stereo type distance recognition apparatus 101 may compare a first signal and a second signal among the received signals, and may compute the distance based on a result of the comparing and a magnitude of each of at least one of the first signal and the second signal, to accurately measure the distance. In other words, the stereo type distance recognition apparatus 101 may compute the distance based on a result obtained by comparing the reflected signals and accordingly, the distance may be accurately measured by reducing a loss error in the received signals.

Additionally, the stereo type distance recognition apparatus 101 may transmit, to the object 103, the IR signals each having a first pattern that is inserted, and may easily cancel an interference signal in the reflected signals by comparing the first pattern with a second pattern in each of the reflected signals. The interference signal may be, for example, IR rays in visible rays. In other words, the stereo type distance recognition apparatus 101 may eliminate an unnecessary signal from the reflected signals using a pattern and thus, it is possible to increase accuracy in computing the distance based on the reflected signals.

Figure 2:
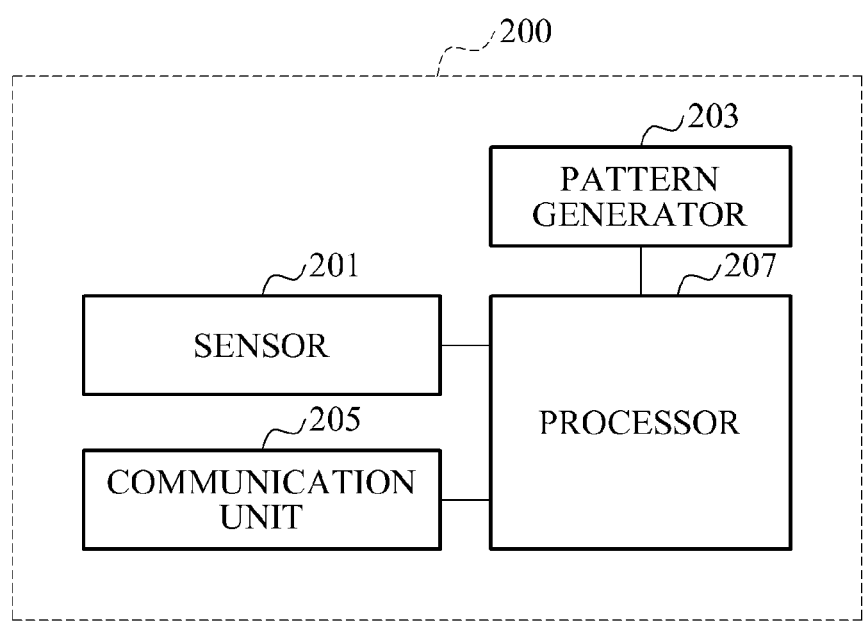
FIG. 2 is a block diagram illustrating a configuration of a stereo type distance recognition apparatus according to an embodiment of the present invention.

FIG. 2 is a block diagram illustrating a configuration of a stereo type distance recognition apparatus 200 according to an embodiment of the present invention.

Referring to FIG. 2, the stereo type distance recognition apparatus 200 may include a sensor 201, a pattern generator 203, a communication unit 205, and a processor 207.

A plurality of sensors 201 may be provided to generate IR signals. The sensors 201 may include, for example, a stereo type IR sensor to generate a plurality of IR signals.

The pattern generator 203 may generate various patterns, and may transfer a generated pattern to the communication unit 205 so that the generated pattern may be inserted into a signal to be transmitted.

The communication unit 205 may transmit the IR signals generated by the sensors 201 to an object of which a location is to be identified, and may receive signals reflected from the object by the IR signals. The reflected signals may be, for example, a first signal and a second signal.

The communication unit 205 may simultaneously transmit the IR signals to the object. Accordingly, a plurality of signals reflected from the object by the IR signals may be acquired in the same environment.

Additionally, the communication unit 205 may insert a set first pattern into each of the IR signals, and may transmit the IR signals to the object. For example, the communication unit 205 may insert different patterns into the IR signals, respectively.

The processor 207 may compute a distance from the object, based on the reflected signals. The processor 207 may eliminate IR rays as an interference signal during transmission of the IR signals to the object and reflection of the signals from the object. The IR rays may be emitted from the sun or a lighting, and may be included in the reflected signals, for example, the first signal and the second signal.

The processor 207 may compare the first signal and the second signal among the reflected signals, and may compute the distance, based on a result of the comparing and a magnitude of each of at least one of the first signal and the second signal.

Additionally, the processor 207 may compare the first signal and the second signal, and may use either the first signal or the second signal based on a result of the comparing, to compute the distance.

In an example, the processor 207 may compare a magnitude of the first signal and a magnitude of the second signal, and may compute the distance, using a signal having a relatively high magnitude between the first signal and the second signal, based on a result of the comparing.

In another example, the processor 207 may compare a loss rate of the first signal and a loss rate of the second signal, and may compute the distance, using a signal having a relatively low loss rate between the first signal and the second signal, based on a result of the comparing. In this example, the loss rate may indicate a difference between a magnitude of a signal transmitted to the object and a magnitude of a signal reflected from the object and received at the communication unit 205.

In still another example, the processor 207 may extract a same area from the first signal and the second signal by comparing the first signal and the second signal, and may compute the distance based on the extracted area.

When the IR signals, each having the first pattern, are transmitted to the object, the processor 207 may extract the second pattern from each of the first signal and the second signal, and may cancel an interference signal from each of the first signal and the second signal based on a result of comparing the extracted second pattern to the first pattern. Accordingly, a more accurate result value may be derived when computing the distance. The interference signal may be, for example, IR rays emitted from the sun or a lighting and included in the first signal and the second signal.

For example, the processor 207 may determine which one of the first signal and the second signal maintains a pattern inserted into each of the IR signals during transmission of the IR signals to the object, and may compute the distance based on the determined signal. In other words, the processor 207 may compute the distance, based on the first signal or the second signal that does not include an interference signal during transmission of the IR signals to the object and reflection of the signals from the object.

Figure 3:
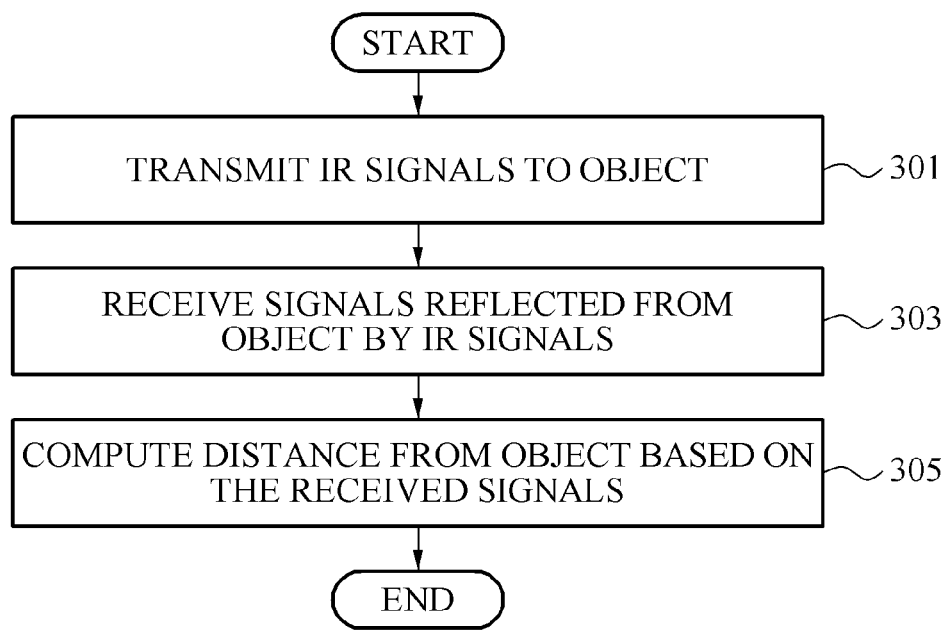
FIG. 3 is a flowchart illustrating a stereo type distance recognition method according to an embodiment of the present invention.

FIG. 3 is a flowchart illustrating a stereo type distance recognition method according to an embodiment of the present invention.

Referring to FIG. 3, in operation 301, a stereo type distance recognition apparatus may generate a plurality of IR signals and transmit the IR signals to an object. For example, the stereo type distance recognition apparatus may generate a plurality of IR signals, using a stereo type IR sensor.

The stereo type distance recognition apparatus may simultaneously transmit the IR signals to the object.

Additionally, the stereo type distance recognition apparatus may insert a set first pattern into each of the IR signals, and may transmit the IR signals to the object. The stereo type distance recognition apparatus may insert different patterns into the IR signals, respectively.

In operation 303, the stereo type distance recognition apparatus may receive signals reflected from the object by the IR signals.

Additionally, the stereo type distance recognition apparatus may eliminate IR rays as an interference signal during transmission of the IR signals to the object and reflection of the signals from the object. The IR rays may be emitted from the sun or a lighting, and may be included in the reflected signals, for example, a first signal and a second signal The interference signal may be included in the reflected signals, for example a first signal and a second signal, and may be emitted from the sun or a lighting.

In operation 305, the stereo type distance recognition apparatus may compute a distance from the object, based on the received signals.

The stereo type distance recognition apparatus may compare the first signal and the second signal among the reflected signals, and may compute the distance, based on a result of the comparing and a magnitude of each of at least one of the first signal and the second signal.

Additionally, the stereo type distance recognition apparatus may compare the first signal and the second signal, and may use either the first signal or the second signal based on a result of the comparing, to compute the distance.

In an example, the stereo type distance recognition apparatus may compare a magnitude of the first signal and a magnitude of the second signal, and may compute the distance, using a signal having a relatively high magnitude between the first signal and the second signal, based on a result of the comparing. In another example, the stereo type distance recognition apparatus may compare a loss rate of the first signal and a loss rate of the second signal, and may compute the distance, using a signal having a relatively low loss rate between the first signal and the second signal, based on a result of the comparing. In this example, the loss rate may indicate a difference between a magnitude of a signal transmitted to the object and a magnitude of a signal reflected from the object. In still another example, the stereo type distance recognition apparatus may extract a same area from the first signal and the second signal by comparing the first signal and the second signal, and may compute the distance based on the extracted area.

When the IR signals, each having the first pattern, are transmitted to the object, the stereo type distance recognition apparatus may extract the second pattern from each of the first signal and the second signal, and may cancel an interference signal from each of the first signal and the second signal based on a result of comparing the extracted second pattern to the first pattern. Accordingly, a more accurate result value may be derived when computing the distance. The interference signal may be, for example, IR rays emitted from the sun or a lighting and included in the first signal and the second signal.

For example, the stereo type distance recognition apparatus may determine which one of the first signal and the second signal maintains a pattern inserted into each of the IR signals during transmission of the IR signals to the object, and may compute the distance based on the determined signal. In other words, the stereo type distance recognition apparatus may compute the distance, based on the first signal or the second signal that does not include an interference signal during transmission of the IR signals to the object and reflection of the signals from the object.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more non-transitory computer readable recording mediums.

The above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A stereo type distance recognition apparatus, comprising:
 a plurality of sensors configured to generate a plurality of infrared (IR) signals;
 a communication unit configured to insert a set first pattern into each of the plurality of generated IR signals and to transmit the IR signals to an object; and a processor configured to extract a second pattern from each of signals reflected from the object by the plurality of IR signals, to cancel an interference signal from each of the reflected signals based on a result of a comparison between the first pattern and the second pattern, and to compute a distance from the object based on signals from which the interference signal is cancelled.

2. The stereo type distance recognition apparatus of claim 1, wherein the processor is configured to compare magnitudes of the reflected signals, and to compute the distance based on a signal having a relatively high magnitude based on a result of the comparing.

3. The stereo type distance recognition apparatus of claim 1, wherein the processor is configured to compare loss rates of the reflected signals, and to compute the distance, using a signal having a relatively low loss rate, based on a result of the comparing.

4. The stereo type distance recognition apparatus of claim 1, wherein the processor is configured to extract a same area from the reflected signals by comparing the reflected signals, and to compute the distance based on the extracted area.

5. The stereo type distance recognition apparatus of claim 1, wherein the communication unit is configured to insert different first patterns into the plurality of IR signals, respectively.

6. The stereo type distance recognition apparatus of claim 1, wherein the processor is configured to eliminate IR rays as the interference signal during transmission of the IR signals to the object and reflection of the signals from the object, the IR rays being emitted from the sun or a lighting and included in the reflected signals.

7. A stereo type distance recognition method, comprising:
generating a plurality of infrared (IR) signals;
inserting a set first pattern into each of the plurality of generated IR signals and transmitting the IR signals to an object;
extracting a second pattern from each of signals reflected from the object by the plurality of IR signals;
cancelling an interference signal from each of the reflected signals based on a result of a comparison between the first pattern and the second pattern; and
computing a distance from the object, based on signals from which the interference signal is cancelled.

8. The stereo type distance recognition method of claim 7, wherein the inserting comprises inserting different first patterns into the plurality of IR signals, respectively.

9. The stereo type distance recognition method of claim 7, wherein the cancelling comprises eliminating IR rays as the interference signal during transmission of the IR signals to the object and reflection of the signals from the object, the IR rays being emitted from the sun or a lighting and included in the reflected signals.

* * * * *